(12) United States Patent
Van Tilborgh

(10) Patent No.: US 10,800,090 B2
(45) Date of Patent: Oct. 13, 2020

(54) METHOD OF AND APPARATUS FOR MANUFACTURING A PLASTIC CONTAINER HAVING A CURLED RIM

(71) Applicant: Dexter Mould Technology B.V., Doetinchem (NL)

(72) Inventor: Erik Van Tilborgh, De Moer (NL)

(73) Assignee: Dexter Mould Technology B.V., Doetinchem (NL)

( * ) Notice: Subject to any disclaimer, the term of this patent is extended or adjusted under 35 U.S.C. 154(b) by 519 days.

(21) Appl. No.: 15/527,421

(22) PCT Filed: Nov. 20, 2015

(86) PCT No.: PCT/NL2015/000039
§ 371 (c)(1),
(2) Date: May 17, 2017

(87) PCT Pub. No.: WO2016/085326
PCT Pub. Date: Jun. 2, 2016

(65) Prior Publication Data
US 2017/0320257 A1  Nov. 9, 2017

(30) Foreign Application Priority Data

Nov. 24, 2014 (NL) .................................... 1041060

(51) Int. Cl.
*B29C 51/32* (2006.01)
*B29C 51/30* (2006.01)
(Continued)

(52) U.S. Cl.
CPC .......... *B29C 51/325* (2013.01); *B29C 51/266* (2013.01); *B29C 51/306* (2013.01);
(Continued)

(58) Field of Classification Search
CPC ..... B29C 51/306; B29C 51/32; B29C 51/325; B29C 51/38
See application file for complete search history.

(56) References Cited

U.S. PATENT DOCUMENTS

| 3,357,053 A | 12/1967 | Lyon et al. |
| 3,825,166 A | 7/1974 | Padovani |
| 2013/0064998 A1 * | 3/2013 | Wnek ........... B21D 22/26 428/34.1 |

FOREIGN PATENT DOCUMENTS

| EP | 0005790 A1 | 12/1979 |
| EP | 0089444 A1 * | 9/1983 ............ B29C 51/32 |

(Continued)

OTHER PUBLICATIONS

International Search Report and Written Opinion for International Patent Application No. PCT/NL2015/000039 dated Feb. 22, 2016.

*Primary Examiner* — Atul P. Khare
(74) *Attorney, Agent, or Firm* — Troutman Pepper Hamilton Sanders LLP; Ryan A. Schneider

(57) ABSTRACT

A method of manufacturing a plastic container having a curled rim (320) comprises the steps of providing a sheet of plastic material; drawing a portion thereof into a mould (120) to form a bottom and wall (310') of the container, leaving a surrounding portion of material to form a rim (320) of the container; cutting the rim loose from a remaining portion of material; and curling the rim. In the curling step, an inner part of the rim is supported by a supporting member while an outer part is pressed by a pressing member (230) moving relative to the supporting member for the rim to be bent around the supporting member.

17 Claims, 12 Drawing Sheets

Figure 1:
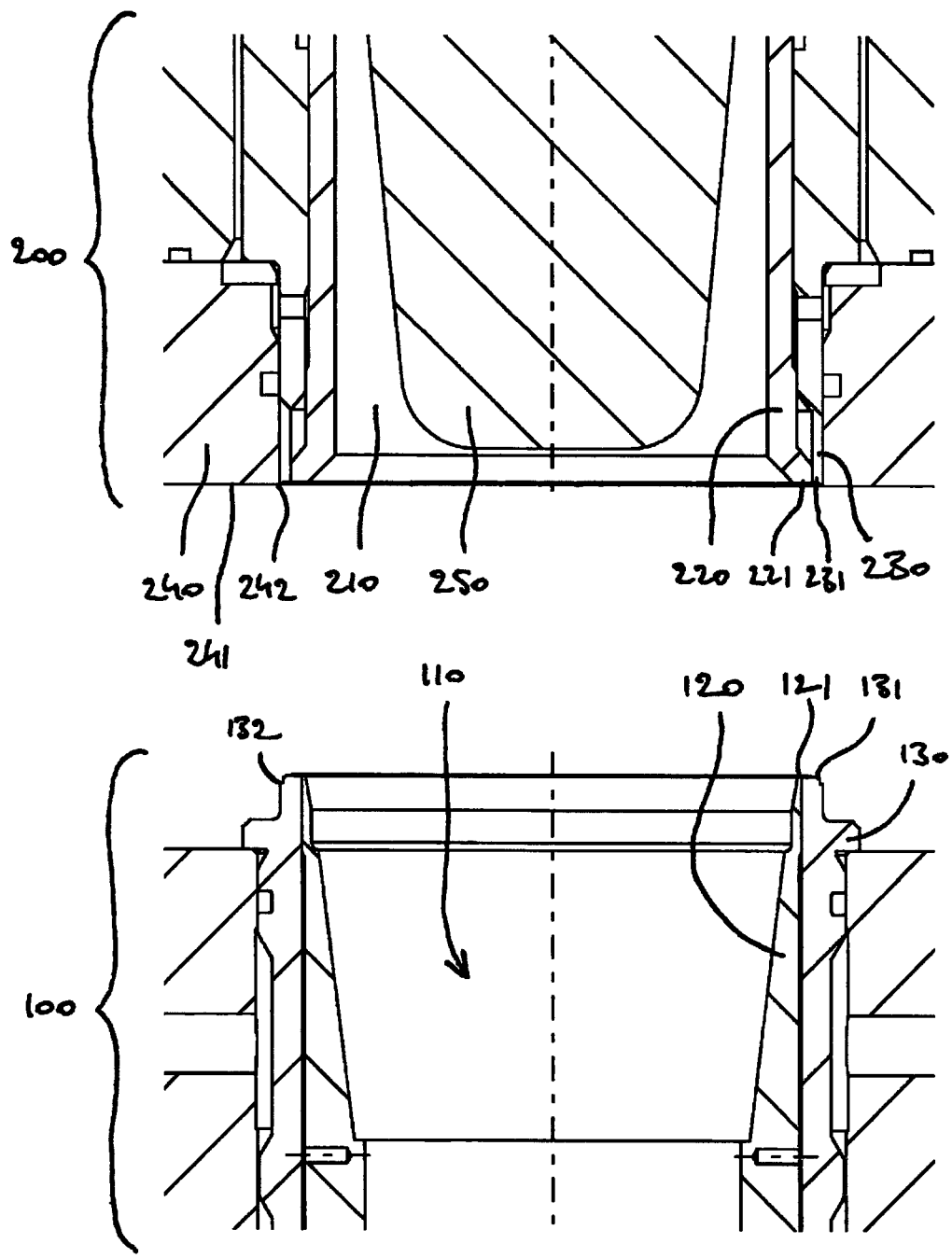

(51) Int. Cl.
    *B29C 51/38*     (2006.01)
    *B29C 51/26*     (2006.01)
    *B65D 1/26*     (2006.01)
    *B29L 31/00*     (2006.01)
    *B29C 51/04*     (2006.01)
    *B29K 105/00*     (2006.01)

(52) U.S. Cl.
    CPC .............. *B29C 51/32* (2013.01); *B29C 51/38* (2013.01); *B29C 51/04* (2013.01); *B29K 2105/256* (2013.01); *B29L 2031/7132* (2013.01)

(56) References Cited

FOREIGN PATENT DOCUMENTS

| | | | | |
|---|---|---|---|---|
| EP | 0103440 A1 | 3/1984 | | |
| EP | 1083040 A1 | 3/2001 | | |
| FR | 2139764 A1 | 1/1973 | | |
| GB | 1140041 A | * | 1/1969 | ............. B29C 51/04 |
| WO | 2013/036731 A2 | 3/2013 | | |

* cited by examiner

METHOD OF AND APPARATUS FOR MANUFACTURING A PLASTIC CONTAINER HAVING A CURLED RIM

The present invention relates to a method of manufacturing a plastic container having a curled rim, comprising the steps of providing a sheet of plastic material; drawing a portion thereof into a mould to form a bottom and wall of the container, leaving a surrounding portion of material to form a rim of the container; cutting the rim loose from a remaining portion of material, and curling the rim.

In the art, it is known for plastic beverage cups to be manufactured out of sheets of plastic material by way of thermoforming. In this process, a portion of a provided sheet of material is drawn into a mould to form the bottom and wall of a cup. A rim of the cup is left to be formed by a portion of material surrounding the portion of material that is drawn into the mould. The rim is separated from remaining material surrounding the rim by way cutting.

In a known method, as part of the thermoforming process, the rim of the cup is given an inverted L-shape in cross section, so as for it to comprise a substantially planar portion extending radially from the cup wall's upper edge, and a cylindrical portion depending from the outer edge of the planar portion. With this configuration, the cut edge is provided at the bottom end of the cylindrical portion. After thermo-forming, the cup is moved to a curling station, where the rim is driven between hot rolls so as for mainly the cylindrical portion of the rim to be bent so as for the cut edge to be oriented more towards the wall of the cup. The rim is thereby shaped for keeping the cut edge away from a person drinking from the cup, to provide a more pleasant drinking experience.

A drawback of the above known method is that the forming and cutting of a cup and the rolling of the rim are performed at separate stations. This is cumbersome, due to transport being required between stations, and processed materials having to be positioned and inserted into certain processing machines twice. Furthermore, machines for curling a rim by hot rolling are relatively expensive, difficult to set up, and only suitable for rolling rims of containers having a circular circumference.

U.S. Pat. No. 3,357,053 discloses a method of manufacturing a plastic beverage cup wherein the forming and cutting of a cup and curling of the rim take place at the same station, within a single apparatus. Within this apparatus, as part of the forming process, a portion of material that is to form the rim of the cup is drawn up into a downwardly facing recess by means of an air pressure difference. By the recess having a curved shape, the rim is given a cross section having an inverted U-shape. The rim is cut loose from a surrounding portion of material by a circular cutting member surrounding the mould that is driven to move up along the mould. The circular cutting member is provided with a slanted edge, pushing an outer leg of the inverted U-shape to curl inward by the cutting member being moved up further after performing the actual cut.

A drawback of the above method is that the apparatus needed is relatively complicated, with each of the portion of material for shaping the bottom and wall of a container and the portion for shaping the rim having to be drawn into its own cavity, and thereby various air channels needing to be present. Furthermore, with the curling process being caused by motion of the cutting member, the cutting member has to be suitably shaped for that, and consequently there may be less control over the cutting process. On the other hand, with the cutting member being optimized to perform the cutting process in a certain way, the curling process may not be optimal.

An objective of the present invention is to provide an improved method for manufacturing a plastic container having a curled rim. In particular, an objective of the present invention is to provide a method for forming and cutting a plastic container with a curled rim at a single station, with relatively much control over especially the curling process, suitable for manufacturing containers having a circular circumference as well as containers having a non-circular circumference.

The above objective is attained by a method according to claim 1.

According to the invention, in the curling step, an inner part of the rim is supported by a supporting member while an outer part is pressed by a pressing member moving relative to the supporting member for the rim to be bent around the supporting member. With the rim bending around a member supporting the rim, the curling process occurs in a relatively controlled way, even in the case that a cutting edge were to be provided on the pressing member, which cutting edge could then be used for performing the cutting step.

In a practical embodiment, the supporting member supports the inner part from below and the pressing member presses down on the outer part, so as for the supporting member and the pressing member to be able to surround a vertically positioned combination of a mandrel and a moulding cavity within a moulding apparatus, wherein the supporting member and the pressing member are movable relative to each other along the main axis of that combination.

The supporting member may comprise a wall part of the mould. Then, depending on the width of said wall part, a curled rim of relatively small radial dimension can be achieved.

In the curling step, the inner part of the rim may be pressed onto the supporting member by an additional pressing member, so as to control the positioning of the inner part during the pressing of the outer part.

Preceding the curling step, the rim may be provided with an initial shape, so as to prepare the rim for achieving a better result in the curling step, or for the curling process to occur in a more controlled way.

In the initial shaping step, the outer part of the rim may be shaped to comprise a depending edge portion. Then, in the curling step, an edge of the rim can be oriented to face the wall of the container being formed with the help of a pressing member moving axially with respect to the container.

In the initial shaping step, the rim may be provided with a groove separating the inner part from the outer part. Such a groove can form a region connecting the inner part to the outer part, which region is configured to deform in a predictable way, so as for the outer part in the curling step to be repositioned with respect to the inner part in a predefined manner.

In the initial shaping step, the outer part may be supported from below by an additional supporting member. Such an additional supporting member may help in securely clamping the rim during the drawing of the bottom and wall of the container or in giving the rim a certain initial shape, for instance by pressing the rim for the rim to be provided with a deformable region, such as a groove, as described.

Preceding the curling step, the additional supporting member may be removed from under the outer part. In such a way, a space can be provided for an outer part of the rim to move through in the curling step, in the end allowing a curled rim to have a relatively small radial dimension.

In the curling step, the rim may be bent for the outer part to be at least partially positioned under the inner part. Again, this can help for a curled rim to have a relatively small radial dimension.

After bending, the rim may be pinched, preferably in the axial direction, for decreasing a height thereof. Once again, in such a way, a curled rim having relatively small dimensions can be created, especially with regard to the axial direction.

The present invention further relates to an apparatus for manufacturing a plastic container having a curled rim out of a sheet of plastic material.

Figure 2:
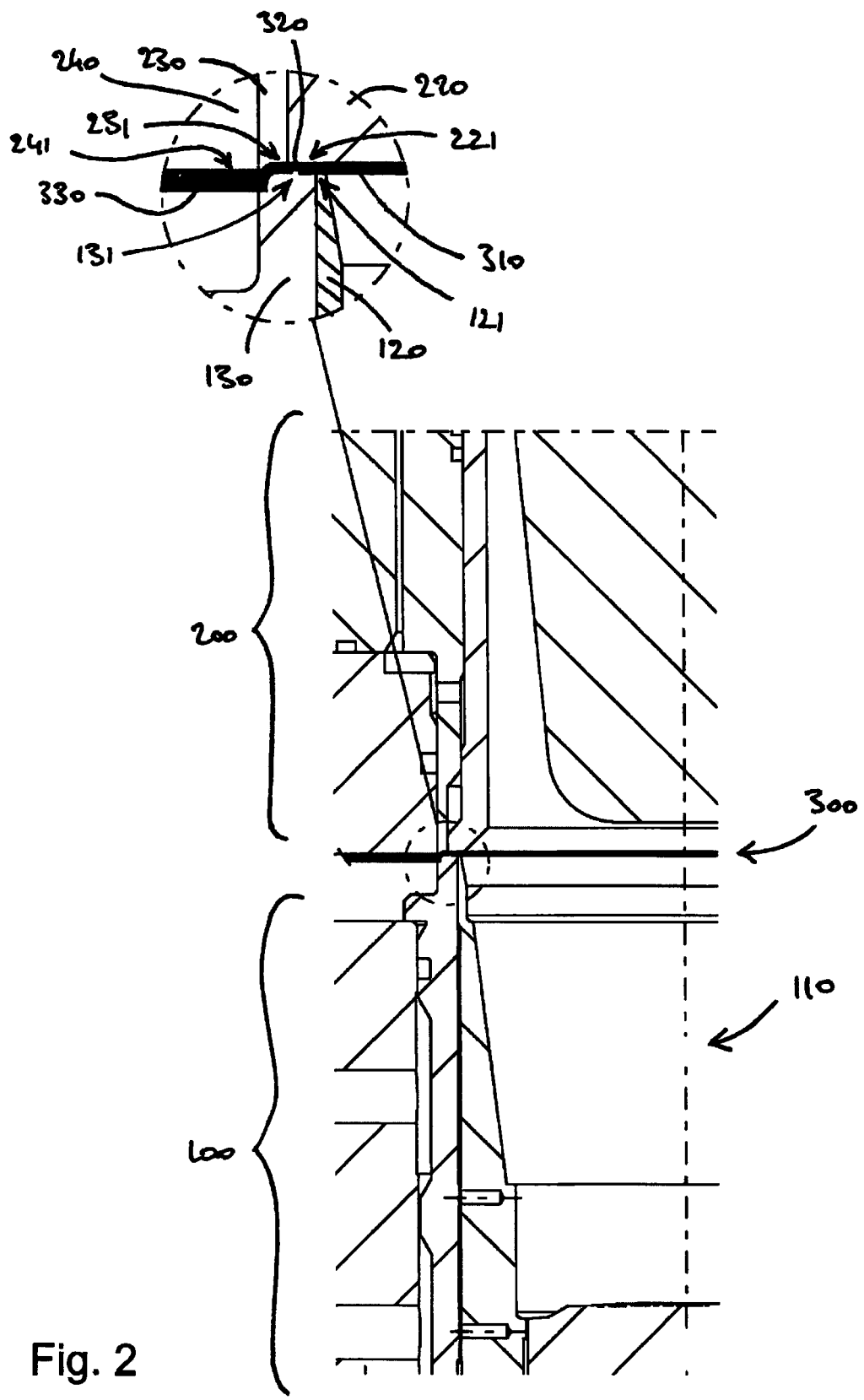
Figure 3:
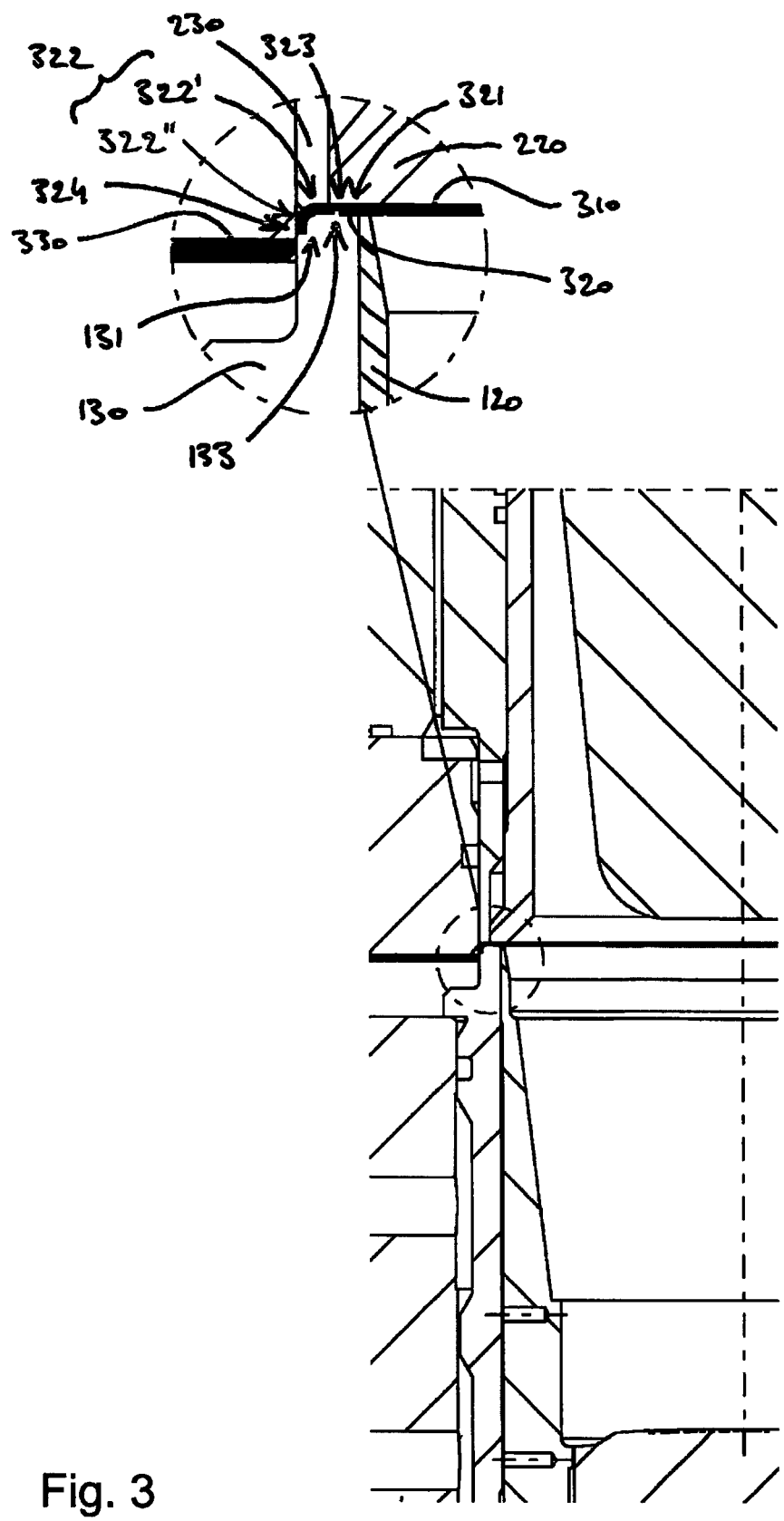
Figure 4:
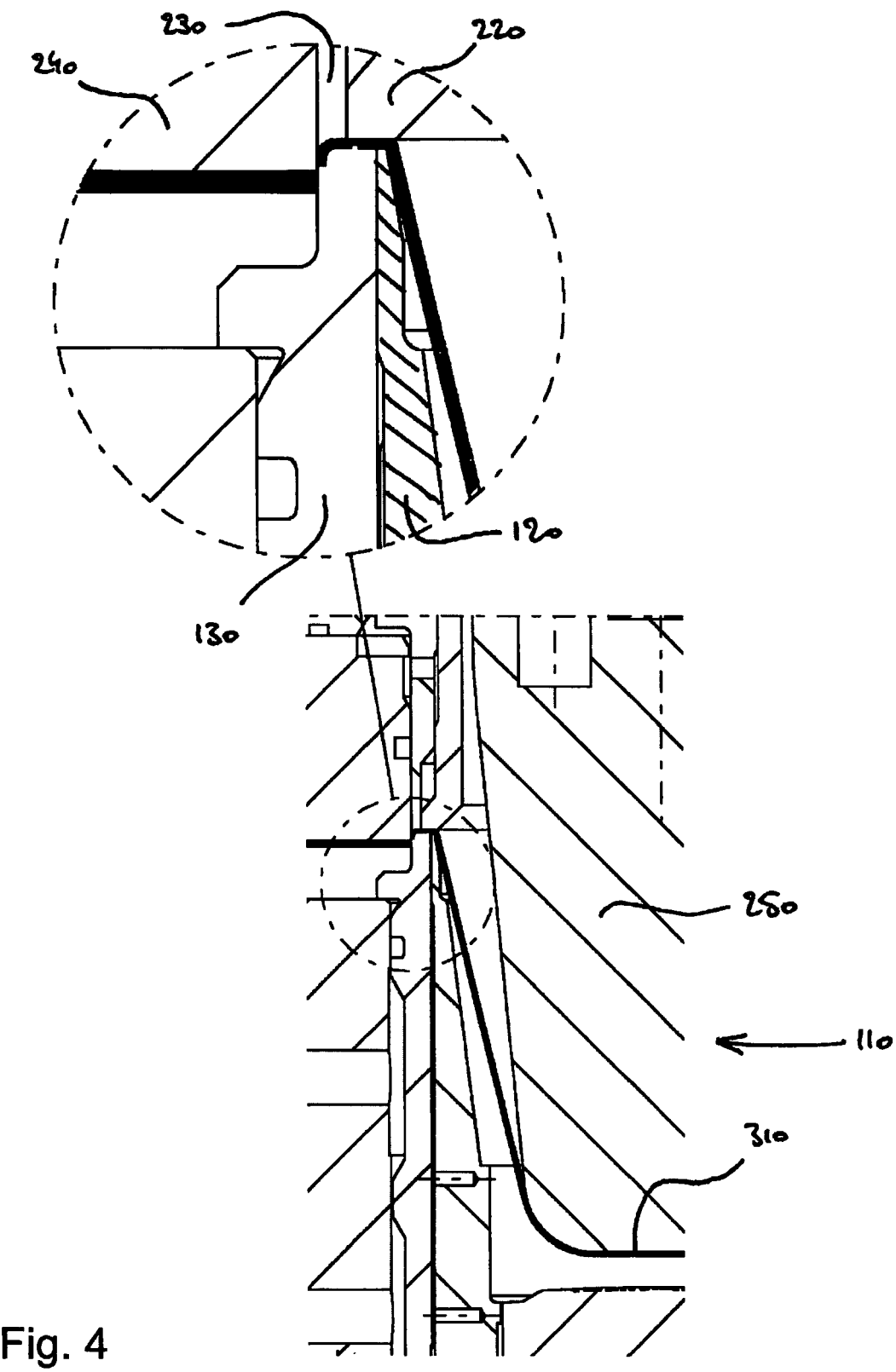
Figure 5:
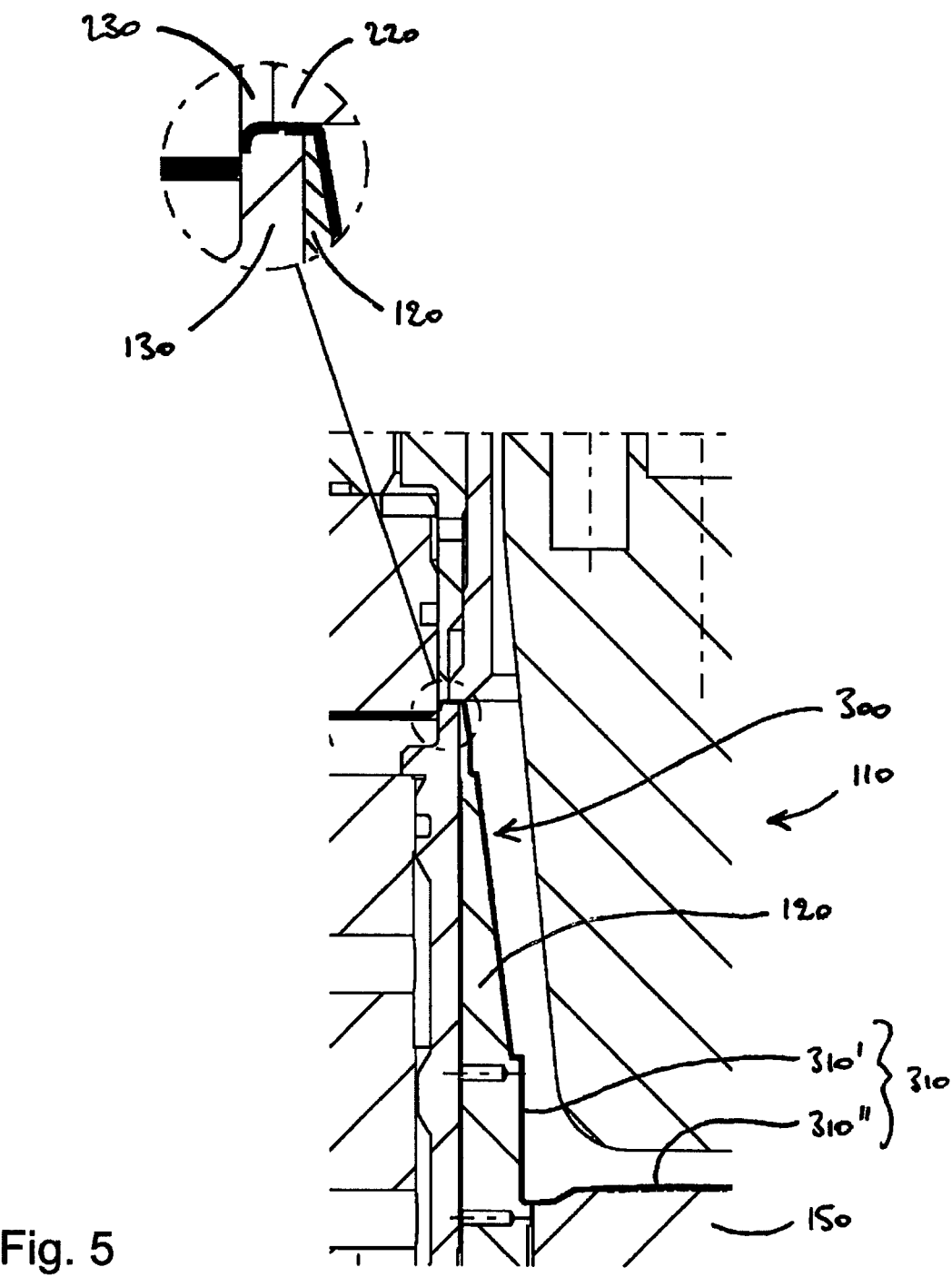
Figure 6:
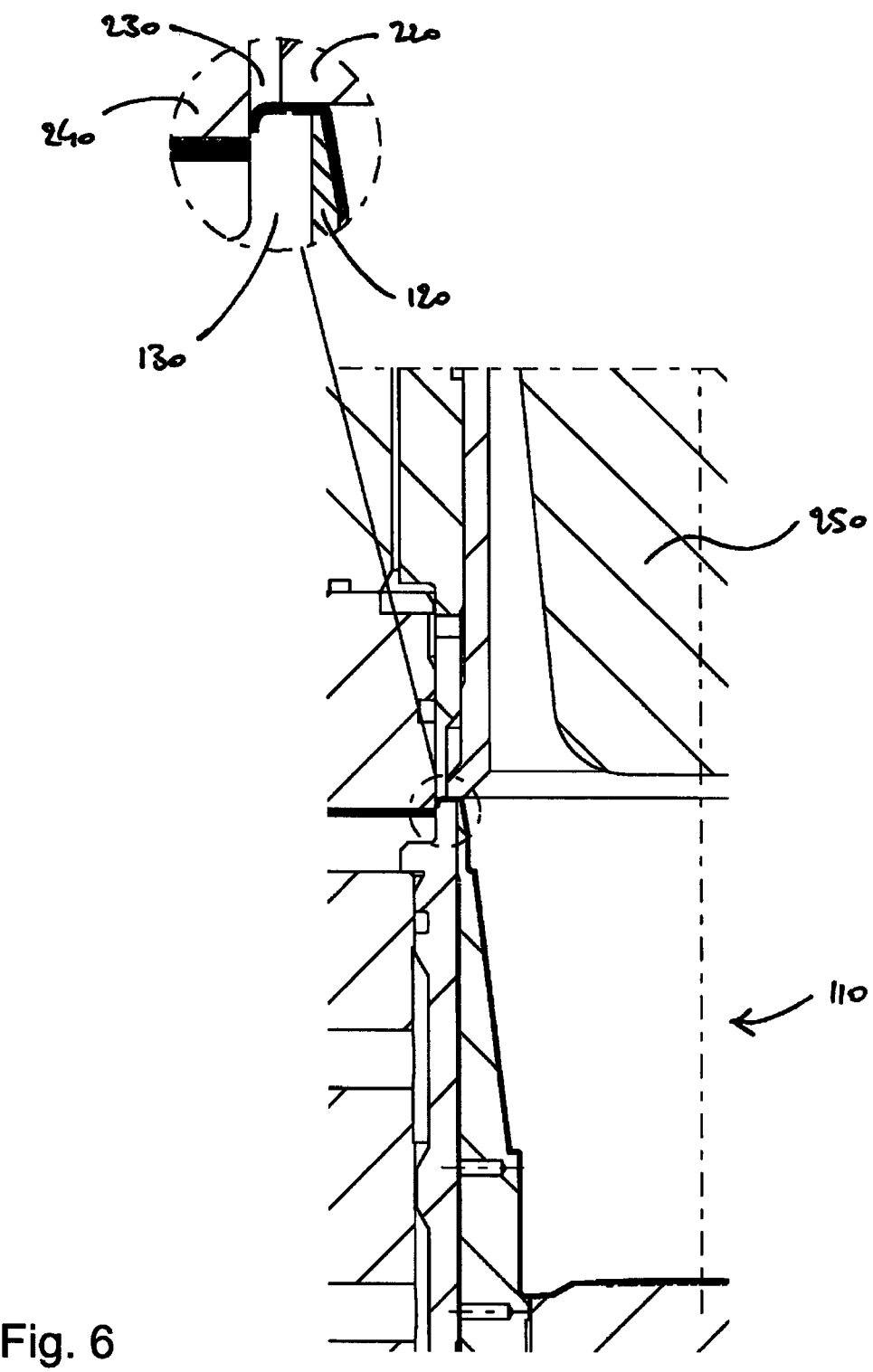
Figure 7:
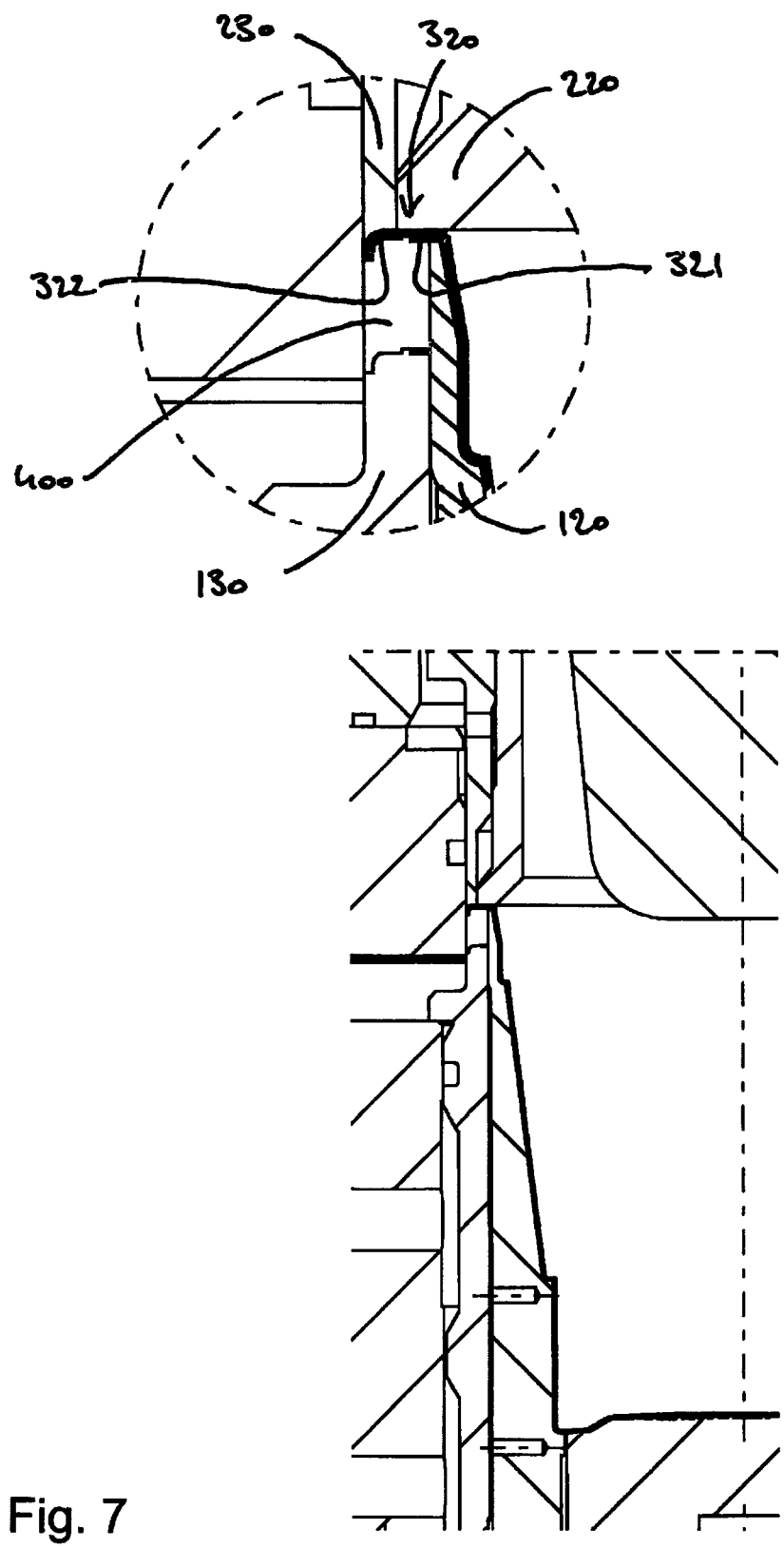
Figure 8:
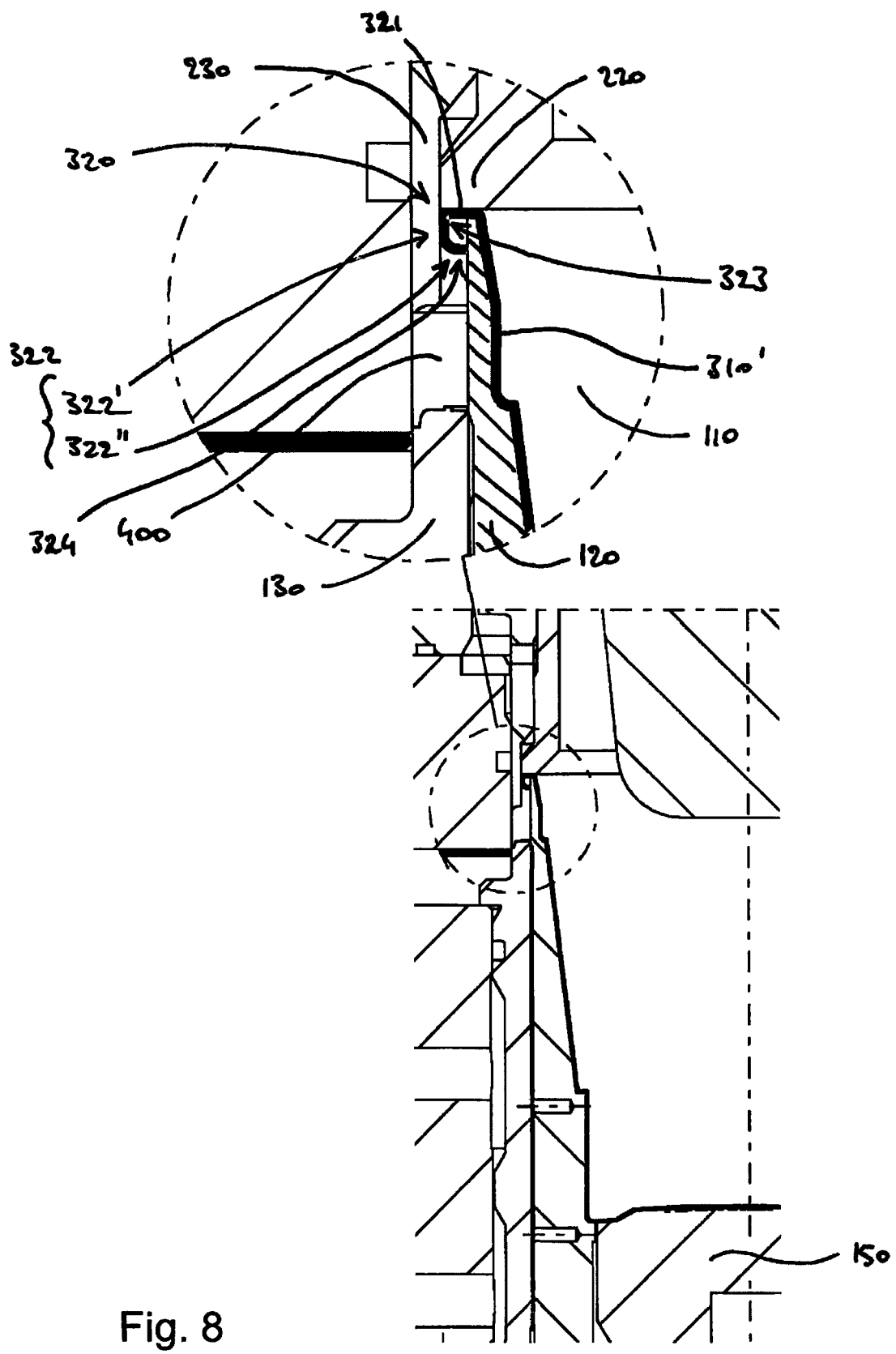
Figure 9:
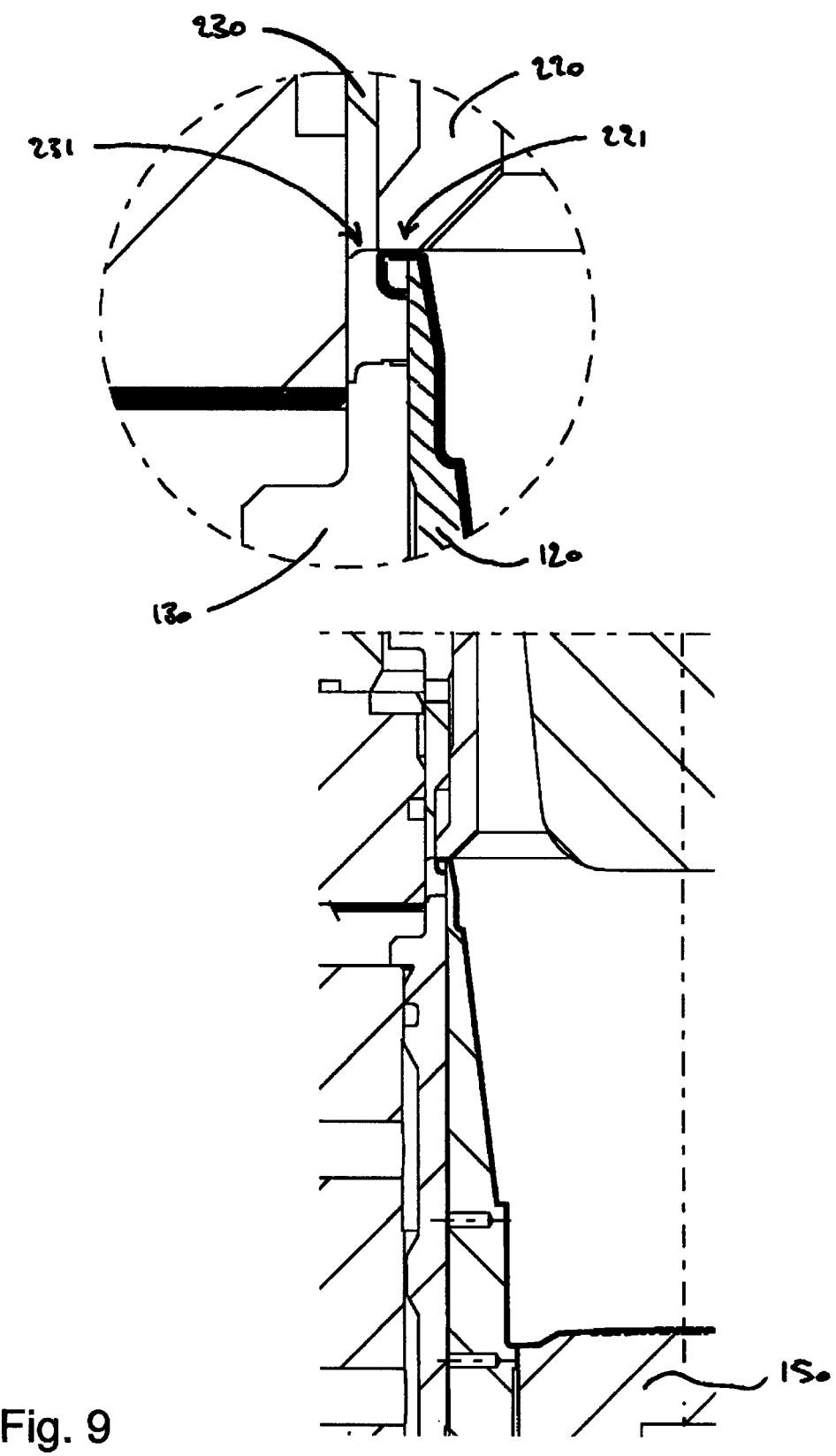
Figure 10:
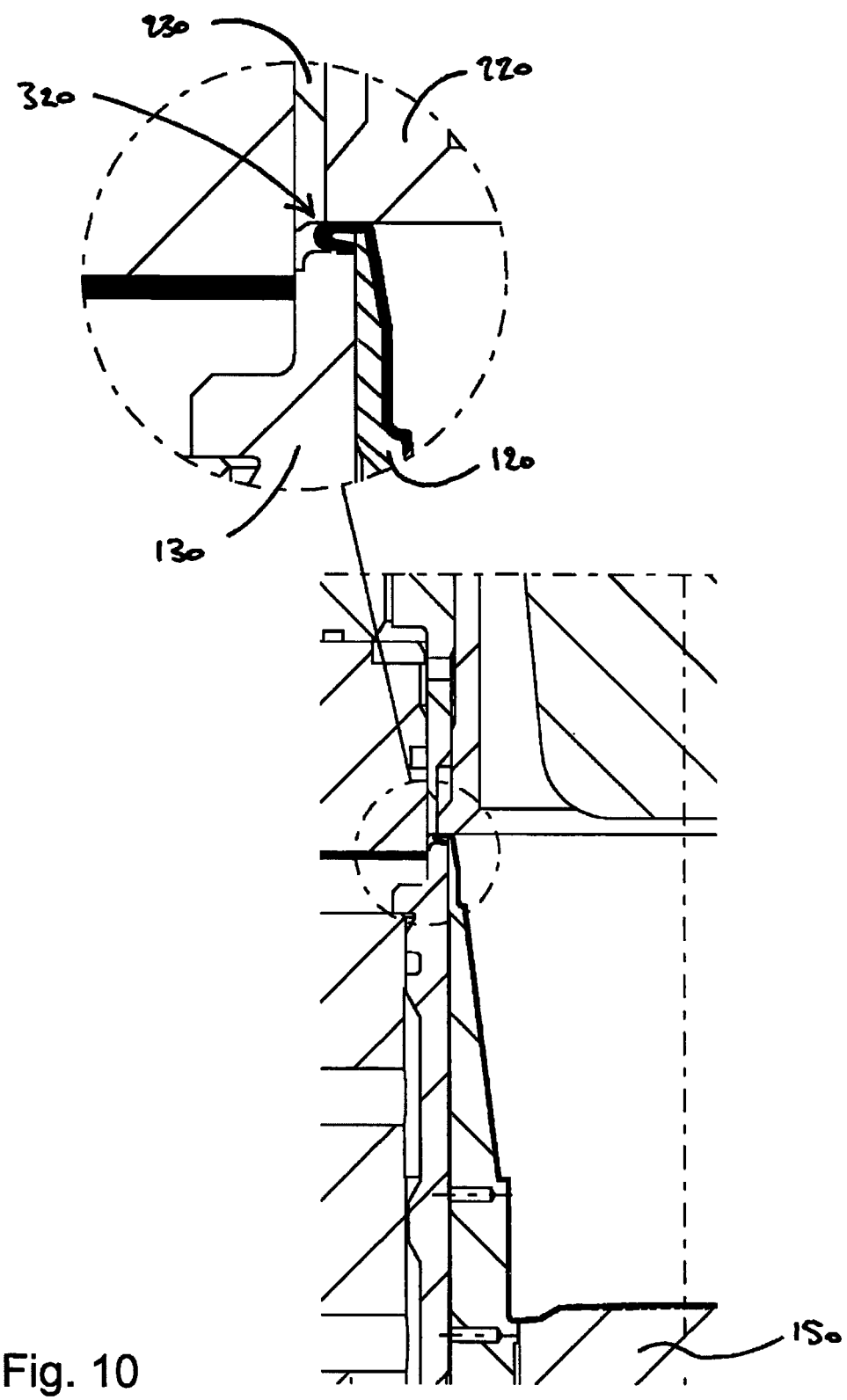
Figure 11:
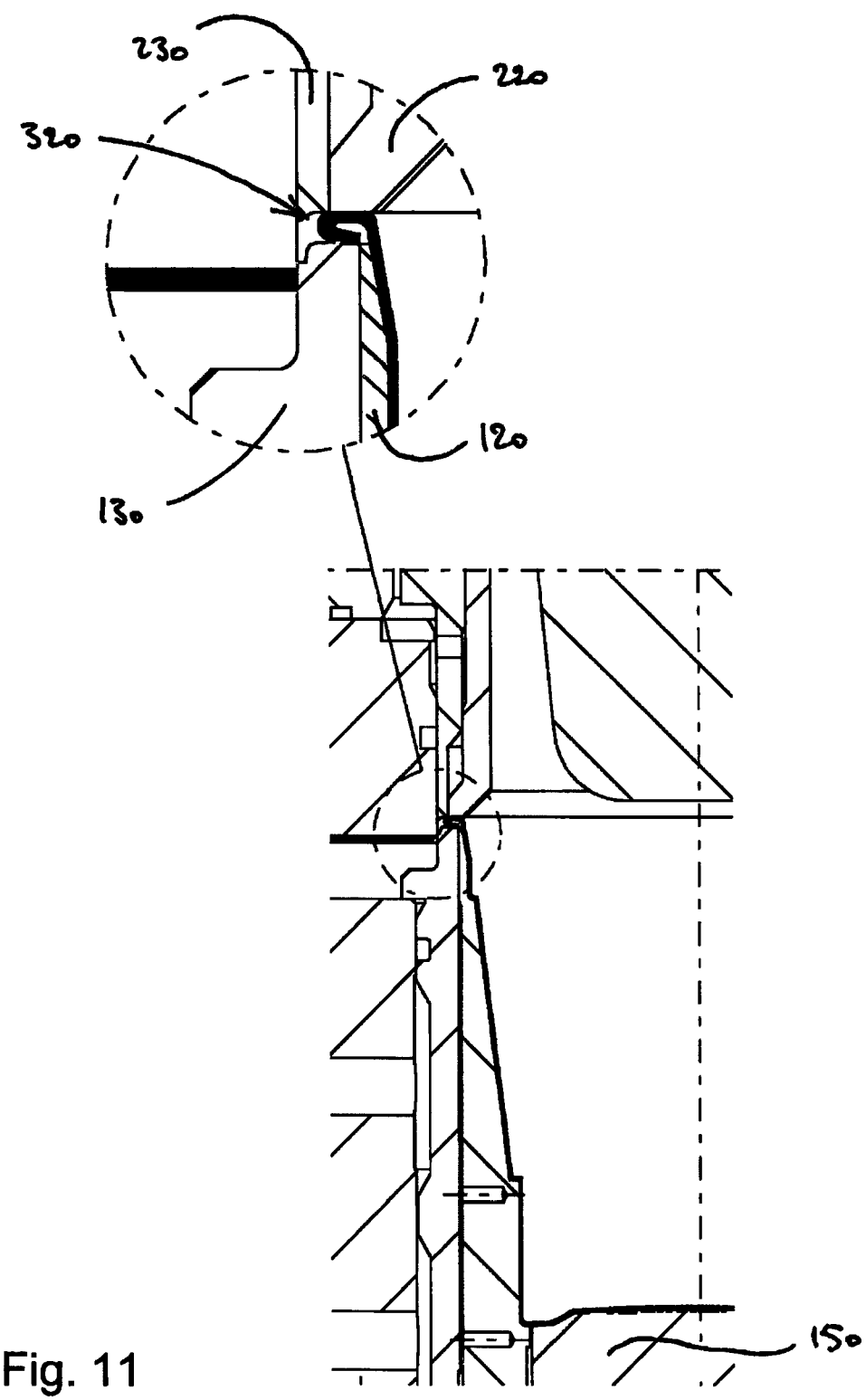
Figure 12:
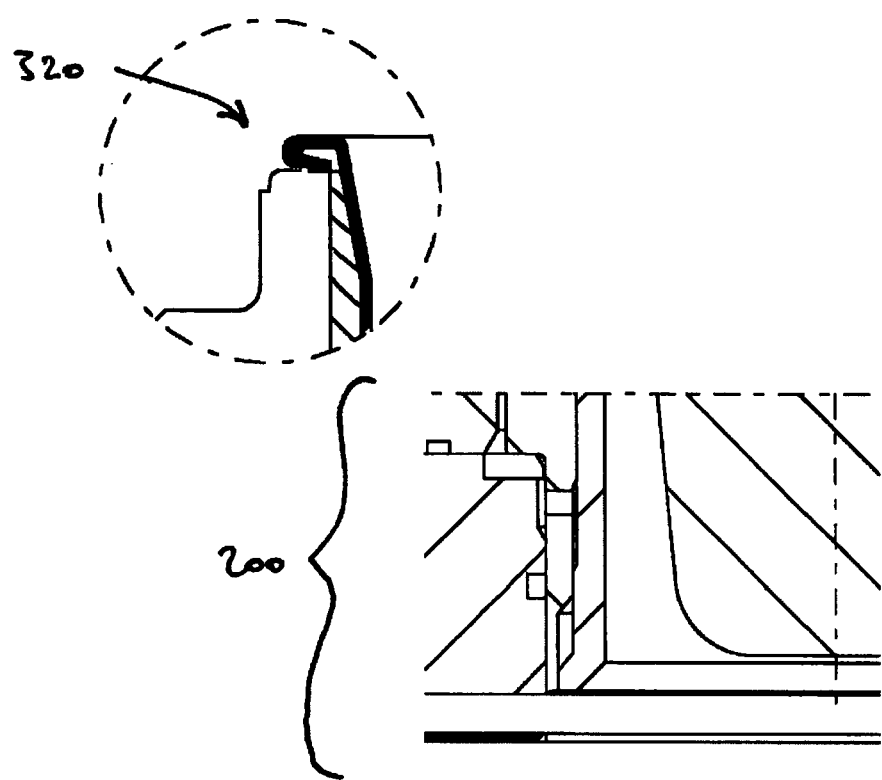
Figure 12:
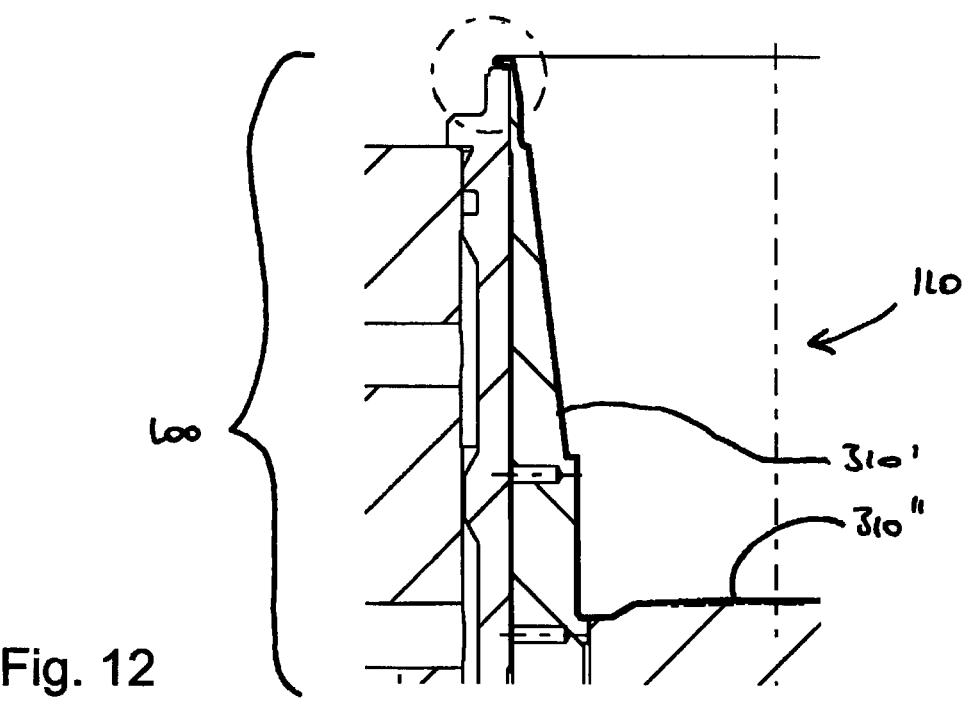

The invention will be explained in more detail with reference to the drawings, wherein FIGS. 1-12 show cross sections and details of cross sections of a device for performing a method according to the invention and cross sections of a sheet of plastic material being moulded at consecutive stages of a process for forming a plastic container, wherein:

FIG. 1 shows and initial stage in which upper and lower moulding means of the device are spaced apart for receiving a sheet of plastic material therein between, FIG. 2 shows a stage in which an inserted sheet of plastic material is clamped in between the upper and lower moulding means, with a portion of the sheet that is to form the bottom and wall of the container being in registration with a moulding cavity provided by the lower moulding means, and a portion of material that is to form a rim of the container having been pressed in between certain members of the upper and lower moulding means to assume an initial shape, FIG. 3 shows a stage in which the initially shaped rim has been cut loose from surrounding material, FIG. 4 shows a stage in which a mandrel of the upper moulding means has been pressed down into the moulding cavity to pre-shape the material portion that is to form the bottom and wall of the container, FIG. 5 shows a stage in which the material portion that is to form the bottom and wall of the container has been drawn towards the wall of the moulding cavity to assume its final shape, FIG. 6 shows a stage in which the mandrel has been retracted, FIG. 7 shows a stage in which certain members of the upper and lower moulding means have been moved relative to each other to remove a support from under an outer part of the initially shaped rim, FIG. 8 shows a stage in which certain members of the upper and lower moulding means have been moved relative to each other to bend the initially shaped rim and thereby to position the outer part thereof under a respective inner part, FIG. 9 shows a stage in which the relatively moved members have been brought back to their previous position with respect to each other, FIG. 10 shows a stage in which certain members of the upper and lower moulding means have been moved relative to each other to pinch the initially shaped and bent rim for the rim to assume its final shape, FIG. 11 shows a stage in which a member of the lower moulding means has been moved relative to other movable members for a support to be removed from under an inner part of the rim in its final shape, FIG. 12 shows a stage in which the upper and lower moulding means have been moved to again be spaced apart for removing the container with the curcled rim as well as the remaining material.

With reference to FIG. 1, a device for performing a method according to the invention comprises lower moulding means 100 and upper moulding means 200.

The lower moulding means 100 comprise a mould having an annular wall part 120 defining the circumferential boundary of a moulding cavity 110 that is to receive a portion of plastic sheet material that is to form the bottom and wall of a container. The annular wall part 120 has a top surface 121 for supporting an inner part of a portion of material that is to form a rim of the container. The annular wall part 120 is surrounded by an outer annular part 130 having a top surface 131 for supporting an outer part of the portion material that is to form a rim of the container.

The upper moulding means 200 comprise a mandrel 250 for pressing a portion of material that is to form the bottom and wall of the container into the moulding cavity 110. The mandrel 250 is arranged in a mandrel cavity 210, the circumferential boundary of which is defined by an annular part 220. The annular part 220 is surrounded by an outer annular part 230. The inner annular part 220 has a bottom surface 221 for pressing down onto an inner part of a portion of material that is to form the rim of the container, and the outer annular part 230 has a bottom surface 231 for pressing down onto an outer part of a portion of material that is to form the rim of the container.

The upper moulding means 200 further comprise an annular cutting member 240 for cutting loose a portion of material that is to form the rim of the container from a remaining portion of material surrounding said rim portion. For this purpose, an inner edge 242 of the annular cutting member 240 is arranged to cooperate with an outer edge 132 of the lower outer annular part 130, said outer edge 132 lining the supporting surface 131 of that part. A bottom surface 241 of the cutting member 240 is to contact and press down the remaining portion of material during the cutting process.

With reference to FIG. 2, the lower moulding means 100 and upper moulding means 200 are movable relative to each other so as for a sheet of plastic material 300 to be clamped therein between, with a portion 310 of material that is to form the bottom and wall of the container in registration with the moulding cavity 110, a surrounding portion 320 that is to form the rim of the container held between the upper annular parts 220, 230 and the lower annular parts 120, 130, and a remaining portion 330 surrounding the rim portion 320 in registration with the cutting member 240.

In the shown embodiment, at least in the position of the annular parts 120, 130 shown in FIG. 2, the two supporting surfaces 121, 131 lie flush along their adjacent edges, so as for the rim portion 320 of the material locally to lie flat against the pair of supporting surfaces 121, 131. Similarly, in the shown position, the two pressing surfaces 221, 231 lie flush along their adjacent edges, so as for the rim portion 320 of the material locally to lie flat against the pair of pressing surfaces 221, 231. Lastly, in the shown position, the pressing surface 231 on the upper outer annular part 230 and the bottom surface 241 of the cutting member 240 lie flush along their adjacent edges.

In the shown embodiment, the pressing surfaces 221, 231 and the supporting surfaces 121, 131 are shaped such as for the held rim portion 320 of the material to be provided with an initial shape, at least after the cutting member 240 has cooperated with the lower outer annular part 130 for the held portion 320 to be separated from the surrounding material portion 330. In this case, with reference to FIG. 3 for readability of the reference signs, the supporting surfaces 121, 131 and pressing surfaces 221, 231 are shaped such as for the held portion of sheet material 320 to assume a shape with a straight inner part 321 of the portion 320 extending in line with the portion of sheet material 310 in registration with the moulding cavity 110 that is to form the bottom and wall of the container, and an outer part 322 having a downwardly curved shape. Having such a shape, the outer part 322 comprises a portion of material 322' directly adjacent to and extending in line with the inner part 321 of the rim portion 320, and a portion of material 322" adjacent (what is to be) the free edge 324 of the rim 320 depending from the earlier portion 322'.

In the shown embodiment, again with reference to FIG. 3, the supporting surface 131 of the lower outer annular part 130 is provided with a circumferential ridge 133 so as for the rim portion 320 of material to comprise in the initial shape a circumferential groove 323 separating the inner part 321 from the outer part 322.

With reference to FIG. 3, from the stage of FIG. 2, the cutting member 340 is movable with respect to the lower annular parts 120, 130 as well as the upper annular parts 220, 230 for the portion of material 330 surrounding the rim portion 320 and the rim portion 320 itself to be cut loose from each other, so as for the rim portion 320 to form the initially shaped rim 320 provided with the free edge 324.

With reference to FIG. 4, the mandrel 250 is movable with respect to the lower annular parts 120, 130 as well as the upper annular parts 220, 230 and the cutting member 240 for pressing down a portion 310 of sheet material that is to form the bottom and wall of the container into the moulding cavity 110 so as for said portion 310 of material to assume a certain pre-shape.

With reference to FIG. 5, a device for performing a method according to the invention is arranged for drawing a pre-shaped portion of material 310 received within the moulding cavity 110 towards the bottom and wall of the mould, wherein a part thereof that is to form the wall 310' of the container is received against the annular wall part 120, and a part that is to form the bottom 310" of the container is received against a bottom part 150 of the mould. Such a step is a main part of many thermoforming processes for manufacturing plastic containers out plastic sheet material, and hence, for a skilled person, it will be clear what kind of means are necessary for the desired result to be achieved. For instance, certain air channels may need to be provided to enable a pressure difference to be created between opposite sides of the portion of sheet material 310 received within the mould. Furthermore, a seal may need to be provided between the sheet of material 300 that is being moulded on the one hand and parts of the device clamping the sheet of material on the other hand, such as for a created pressure or vacuum chamber to be suitably closed off from the environment. In the shown embodiment, this type of sealing could be performed by at least one of the pair of the lower and upper inner annular parts 120, 220, the pair of the lower and upper outer annular parts 130, 230, and the pair of the lower outer annular part 130 and the upper inner annular part 220 clamping a portion of the sheet material.

With reference to FIG. 6, the mandrel 250 is retractable from the moulding cavity 110 while the various annular parts 120, 130, 220, 230 and the cutting member 240 remain stationary with respect to each other.

With reference to FIG. 7, the mould wall part 120 is movable relative to the lower outer annular part 130 together with the upper annular parts 220, 230 and, at least in the shown example, the mould bottom part 150, in order for a support to be removed from under the outer part 322 of the initially shaped rim 320. With said support being formed by the lower outer annular part 130, through the respective motion, an intermediate space 400 is created in between the initially shaped rim 320, and said lower outer annular part 130. With the lower outer annular part 130 partly being in registration with the inner part 321 of the initially shaped rim 320, in creating the space 400, a support is also removed from under said inner part 321. With the intermediate space 400 present, said inner part 321 is however still supported by the lower inner annular part 120.

With reference to FIG. 8, the mould wall part 120 is movable together with the upper inner annular part 220 and, at least in the shown example, the mould bottom part 150, relative to the lower outer annular part 130 and the upper outer annular part 230, to bend the initially shaped rim 320 and thereby to position the outer part 322 thereof under the inner part 321. In the shown embodiment, the bending angle is about 90 degrees, as a result of which the previously downwardly oriented depending portion 322" of the curved outer part 322 is positioned to extend radially inward with respect to the moulding cavity 110, the free edge 324 thereby facing the formed wall 310' of the container.

In the shown example, the bending is enabled by the formed groove 323 forming a defined folding line. It will be clear that at least in the shown embodiment, the bending is further enabled by the lower outer annular part 130 being in registration with both upper annular parts 220, 230, by the upper outer annular part 230 being positioned radially outward with respect to the ridge 133 provided on the lower outer annular part 130, and by the outer part 322 of the initially shaped rim 320 being enabled to move from under the upper outer annular part 230 towards under the upper inner annular part 220 through the created intermediate space 400.

With reference to FIG. 9, the mould wall part 120 is movable together with the two upper annular parts 220, 230 and, at least in the shown example, the mould bottom part 150, relative to the lower outer annular part 130 and the upper outer annular part 230, to bring the various parts back to their previous position with respect to each other, and for the two pressing surfaces 221, 231 again to lie flush along their adjacent edges.

With reference to FIG. 10, the mould wall part 120 is movable together with the two upper annular parts 220, 230 and, at least in the shown example, the mould bottom part 150, relative to the lower outer annular part 130, so as for the initially shaped and bent rim 320 to be pinched in between and by the upper annular parts 220, 230 and the lower outer annular part 130 for reducing the height of the initially shaped and bent rim 320. In the shown embodiment, the rim 320 thereby assumes its final shape.

With reference to FIG. 11, the mould wall part 120 is movable, preferably together with the mould bottom part 150, relative to the lower outer annular part 130 and the upper annular parts 220, 230 for releasing the curled rim 320 from the mould wall part 120.

With reference to FIG. 12, the upper moulding means 200 are movable relative to the lower moulding means 100 to enable the formed container, comprising the bottom 310", the wall 310' and the curled rim 320 to be taken out of the moulding cavity 110.

A method according to the invention performed with an apparatus as described in the above comprises performing the actual steps of moving various parts of the apparatus relative to other parts of the apparatus as described to be possible in the above, preferably in the order in which the ability of certain parts to perform such a motion is presented above.

In the embodiment shown in the figures, if the lower outer annular part 130 is taken as a stationary reference, first, the upper moulding means 200 are lowered onto the lower moulding means 100 for clamping a sheet of plastic material 300 therein between, wherein the portion 320 of material that is to form the rim is given an initial shape. Next, the cutting member 240 is moved down for cutting the rim 320 loose from a surrounding portion of material 330. Next, the mandrel 250 is moved down into the moulding cavity 110 to provide the portion 310 of material that is to form the bottom and wall of the container with a pre-shape. Next, said portion 310 of material is drawn further into the moulding cavity 110 for the bottom 310" and wall 310' of the container to assume their final shapes. Next, the mandrel 250 is moved up again. Then, the mould wall part 120 and the mould bottom part 150 are moved up together with both upper annular parts 220, 230 to provide a space 400 under the initially shaped rim 320. Next, the upper outer annular part 230 is moved down for bending the rim 320. Then, the upper inner annular part 220 is moved down to be level with the upper outer annular part 230 again. Next, the mould wall part 120 and mould bottom part 150 are moved down together with both upper annular parts 220, 230 for pinching the bent rim 230. Finally, the mould wall part 120 and mould bottom part 150 are moved down to their original position with respect to the lower outer annular part 130, to release the formed container having its rim 320 resting on the supporting surface of said lower outer annular part 130. For releasing the container, the upper moulding means 200 are moved up to be in their original position again.

In the above, a method according to the invention and an apparatus for performing the method were described in the context of certain specific embodiments. It will be clear that various amendments to these embodiments are possible without departing from the scope of protection as defined by the appended claims. In particular, features or method steps of different embodiments may in combination provide new embodiments providing certain advantages.

In the shown embodiments, all relative motions of various parts with respect to each other occur along a common axis, more in particular an axis along which the mandrel is movable for pressing a portion of sheet material into the moulding cavity, around which axis the various annular parts are arranged. For sake of completeness it is noted, that any references in the above to radial, axial and circumferential directions are to be taken with respect to said common axis, and that the terms inner and outer are to be taken in the radial direction with respect to said axis. Whenever certain parts are said to be in registration with each other, at least an end of each part is understood to have a position and size in the radial direction so as to have a degree of overlap with at least an end of the other part.

Having annular parts perform motions along a common axis can be advantageous, for instance with respect to the degree of simplicity of construction of an apparatus for performing a method according to the invention. However, it is noted, that the invention is not limited to the use of annular parts, and/or parts that move along a common axis. For instance, it is also conceivable the parts are configured for performing other types of relative movements, as long as a portion of material forming a rim of the container is bent by such a relative movement.

It is noted that annular parts with either the upper moulding means or the lower moulding means preferably are positioned directly adjacent, or surrounding, each other. Embodiments of the invention may be conceivable, however, with annular parts as described in the above being positioned at a certain distance from each other, for instance having an additional annular part position in between. In a beneficial embodiment, when seen from the container wall towards the rim edge, there may be multiple parts with a rim of a container that an apparatus is configured to bend in multiple bending steps. In such a way, it would for instance be possible for a very outer part to be bent down with respect to an intermediate part, and for the intermediate part to be bent down next with respect to a very inner part. In such a case, it would for instance not be necessary for at least the outer part of the rim to be shaped in an initial shaping step so as for it to comprise a depending edge portion.

Within any arrangement of certain annular parts, an outer part may be a cutting member, i.e. a part provided with an edge for cooperating with an edge on another part for cutting a provided sheet of material, wherein the upper moulding means or the lower moulding means may comprise a cutting member configured to cooperate with a supporting member or a pressing member being part of, respectively, the lower moulding means or the upper moulding means, for cutting a provided sheet of material. Said cutting member may itself be configured not to be a pressing member or supporting member, and may be positioned radially outward with respect to the member that it is to cooperate with.

It is noted that where, in the above, certain upper and lower means are referred to, those means need not necessarily be positioned above each other in a vertical direction. In principle, the means referred to can also be positioned spaced apart, and/or movable with respect to each other along a horizontal axis, or an axis having another orientation.

With respect to the various method steps described it is noted that the order in which they were presented to be performable is not an order in which the steps necessarily need to be performed. In particular, the step of drawing a portion of material into the moulding cavity may in principle also be performed after any steps contributing to the process of shaping and curling the rim for the rim to assume its final shape. Still, the presented order of all the steps combined or a relative order of certain individual steps with respect to each other as derivable from the presented order of all the steps combined can have a certain advantage, wherein it may also be case that certain steps can be performed consecutively without performing steps that were presented as intermediate steps as actual intermediate steps, but rather as preceding steps, or additional steps.

With respect to the motion of various parts as described, whenever such a motion is described as a relative motion, either the part that is described to be movable with respect to another part can be moved while the other part remains stationary, or kept stationary while the other part is moved. In principle, any relative motion as described may also performable by the part described as relatively movable and the other part being moved at the same time. It will be clear that for any relative movement to be performed, driving means will be present, enabling respective movable parts to be displaced with respect to each other. For the upper moulding means as a group to be movable relative to the lower moulding means, a base will need to be present to which both the upper moulding means and the lower moulding means are connected, as well as driving means for driving the upper moulding means and/or lower moulding means relative to said base.

Finally, it is noted that the invention has been described in the context of plastic containers. It will be clear that the term container is to be construed as to comprise cups, trays, bowls, and the like, or any type of container that is suitable to be made using the techniques described.

The invention claimed is:

1. A moulding apparatus comprising:
    a lower mould portion having a moulding cavity and comprising:
        a bottom part having a cavity-facing surface;
        an inner annular part including:
            a circumferential cavity-facing surface; and
            a top surface having an outer radius; and
        an outer annular part arranged around the inner annular part of the lower mould portion, the outer annular part of the lower mould portion including an outer edge and a top surface having an inner radius and an outer radius;
        wherein the moulding cavity is defined by the cavity-facing surface of the bottom part of the lower mould portion and the circumferential cavity-facing surface of the inner annular part of the lower mould portion; and
        wherein the inner radius of the top surface of the outer annular part of the lower mould portion is cooperatively shaped to correspond with the outer radius of the top surface of the inner annular part of the lower mould portion; and
    an upper mould portion having a mandrel cavity and comprising:
        a central mandrel;
        an inner annular part including:
            a circumferential cavity-facing surface; and
            a bottom surface having an outer radius that is larger than the outer radius of the top surface of the inner annular part of the lower mould portion;
        an intermediate annular part arranged around the inner annular part of the upper mould portion, the intermediate annular part of the upper mould portion including a bottom surface having an inner radius and an outer radius and being configured to bend down a planar rim portion of a sheet of plastic material and then curl the bent rim portion; and
        an outer annular part of the upper mould portion arranged around the intermediate annular part of the upper mould portion, the outer annular part of the upper mould portion including a bottom surface having an inner radius and an outer radius;
        wherein the mandrel cavity is defined by the circumferential cavity-facing surface of the inner annular part of the upper mould portion;
        wherein the central mandrel is arranged in the mandrel cavity;
        wherein the inner radius of the bottom surface of the intermediate annular part of the upper mould portion is cooperatively shaped to correspond with the outer radius of the bottom surface of the inner annular part of the upper mould portion;
        wherein the outer radius of the bottom surface of the intermediate annular part of the upper mould portion is cooperatively shaped to correspond with the outer radius of the top surface of the outer annular part of the lower mould portion; and
        wherein the inner radius of the bottom surface of the outer annular part of the upper mould portion is cooperatively shaped to correspond with both the outer radius of the bottom surface of the intermediate annular part of the upper mould portion and the outer radius of the top surface of the outer annular part of the lower mould portion;
    wherein each of the inner annular part of the lower mould portion, the outer annular part of the lower mould portion, the inner annular part of the upper mould portion, the intermediate annular part of the upper mould portion, and the outer annular part of the upper mould portion are individually axially movable with respect to each other; and
    wherein the bottom surface of the intermediate annular part of the upper mould portion and the top surface of the outer annular part of the lower mould portion are cooperatively shaped.

2. The moulding apparatus of claim 1, wherein the bottom surface of the intermediate annular part of the upper mould portion has a concave portion;
    wherein the top surface of the outer annular part of the lower mould portion has a convex portion adjacent the outer edge; and
    wherein the convex portion of the top surface of the outer annular part of the lower mould portion is cooperatively shaped and aligned with the concave portion of the bottom surface of the intermediate annular part of the upper mould portion.

3. The moulding apparatus of claim 1, wherein the top surface of the outer annular part of the lower mould portion comprises a circumferential ridge having a radius larger than the outer radius of the top surface of the inner annular part of the lower mould portion, and smaller than the outer radius of the bottom surface of the inner annular part of the upper mould portion.

4. A moulding system comprising:
    the moulding apparatus of claim 1;
    the sheet of plastic material; and
    a first operational condition of the system defining relationships between the lower mould portion and the upper mould portion;
    wherein the moulding system provides a plastic container having a curled rim formed from the sheet of plastic material; and
    wherein the first operational condition comprises:
        a first raised position where the inner annular part of the lower mould portion and the outer annular part of the lower mould portion are configured to support an annular portion of the sheet of plastic material;
        a first lowered position where the inner annular part of the upper mould portion and the intermediate annular part of the upper mould portion are configured such that the annular portion of the sheet of plastic material is held between, on one side of the sheet, the inner annular part and the intermediate annular part of the upper mould portion, and on an opposite side of the sheet, the inner annular part and the outer annular part of the lower mould portion;
        a first bending position where the top surface of the outer annular part of the lower mould portion and the bottom surface of the intermediate annular part of the upper mould portion are configured to cooperate to bend down the planar rim portion of the sheet material around the outer annular part of the lower mould portion to give an outer part of the annular portion of the sheet of plastic material a curved-down shape; and a second raised position where the outer annular part of the upper mould portion is configured above the sheet of plastic material.

5. The moulding system of claim 4 further comprising a second operational condition of the system comprising:

a second lowered position where the outer annular part of the upper mould portion, starting from the first operational condition of the system, is configured to move down axially with respect to each of the inner annular part of the lower mould portion, the outer annular part of the lower mould portion, the inner annular part of the upper mould portion, and the intermediate annular part of the upper mould portion; and a cut position where the outer annular part of the upper mould portion, after the second lowered position and in cooperation with the outer edge of the outer annular part of the lower mould portion, is configured to cut the annular portion of the sheet of plastic material free from the sheet material.

6. The moulding system of claim 5 further comprising a third operational condition of the system having a third lowered position where the outer annular part of the lower mould portion, starting from the second operational condition of the system, is configured to move down axially with respect to the inner annular part of the lower mould portion, such that the curved-down shape portion of the annular portion of the sheet of plastic material is without support.

7. The moulding system of claim 6 further comprising a fourth operational condition of the system comprising:

a third raised position where the inner annular part of the lower mould portion together with the inner annular part of the upper mould portion, starting from the third operational condition of the system, have moved up axially with respect to the outer annular part of the lower mould portion and the intermediate annular part of the upper mould portion; and a second bending position where the intermediate annular part of the upper mould portion bends down the curved-down shape portion of the annular portion of the sheet of plastic material with respect to an inner portion of the annular portion of the sheet of plastic material supported by the inner annular part of the lower mould portion such that the curved-down shape portion of the annular portion of the sheet of plastic material is positioned under the inner portion of the annular portion of the sheet of plastic material.

8. The moulding system of claim 7 further comprising a fifth operational condition of the system having a fourth lowered position where the inner annular part of the lower mould portion together with the inner annular part of the upper mould portion, starting from the fourth operational condition of the system, have moved down axially with respect to the outer annular part of the lower mould portion and the intermediate annular part of the upper mould portion, such that the bottom surface of the inner annular part of the upper mould portion and the bottom surface of the intermediate annular part of the upper mould portion are flush with each other.

9. The moulding system of claim 8 further comprising a sixth operational condition of the system having a fifth lowered position where the inner annular part of the lower mould portion together with the inner annular part of the upper mould portion, starting from the fifth operational condition of the system, have moved down axially with respect to the outer annular part of the lower mould portion such that the annular portion of the sheet of plastic material is pinched axially between the outer annular part of the lower mould portion and the inner annular part and the intermediate annular part of the upper mould portion.

10. A moulding apparatus for manufacturing a plastic container having a curled rim out of a sheet of plastic material, the moulding apparatus comprising upper and lower moulding means for receiving therein between the sheet of plastic material;

wherein the lower moulding means comprises:

a mould having a bottom and a first lower annular wall part, defining a bottom and circumferential wall, respectively, of a moulding cavity, wherein the first lower annular wall part has a first top surface having a first outer radius; and an outer annular lower mould part arranged around the first lower annular wall part, wherein the outer annular lower mould part has a second top surface having a second inner radius corresponding to the first outer radius, and having a second outer radius;

wherein the upper moulding means comprises:

a central mandrel arranged in a mandrel cavity;

a first upper annular wall part defining a circumferential boundary of the mandrel cavity, wherein the first upper annular wall part has a first bottom surface having a third outer radius;

a second upper annular wall part arranged around the first upper annular wall part, wherein the second upper annular wall part has a second bottom surface having a fourth inner radius corresponding to the third outer radius, and having a fourth outer radius corresponding to the second outer radius of the outer annular lower mould part; and a third upper annular wall part arranged around the second upper annular wall part, wherein the third upper annular wall part has a third bottom surface having a fifth inner radius corresponding to each of the fourth outer radius and the second outer radius of the outer annular lower mould part;

wherein the third outer radius of the first upper annular wall part is larger than the first outer radius of the first lower annular wall part;

wherein the first lower annular wall part, the outer annular lower mould part, the first upper annular wall part, the second upper annular wall part, and the third upper annular wall part are individually axially movable with respect to each other; and wherein the second bottom surface of the second upper annular wall part and the second top surface of the outer annular lower mould part have corresponding shapes selected to curve down the rim of the sheet of plastic material, the second bottom surface of the second upper annular wall part further configured to curl the curved rim.

11. The moulding apparatus of claim 10, wherein the second bottom surface of the second upper annular wall part has a concave shape, and wherein the second top surface of the outer annular lower mould part has a convex portion adjacent its outer edge, the convex portion being in conformity with and aligned with the concave second bottom surface of the second upper annular wall part.

12. The moulding apparatus of claim 10, wherein:

the apparatus has a first operational condition in which:

the first lower annular wall part and the outer annular lower mould part are in a raised position to support an annular portion of the sheet of plastic material that is to form the rim of the container;

the first upper annular wall part and the second upper annular wall part are in a lowered position such that the annular portion of the sheet of plastic material is held between the first and second upper annular wall parts and the first and outer lower annular wall parts, with the second top surface of the outer annular lower mould part and the second bottom surface of the second upper annular wall part cooperating to bend down a portion of sheet material around the outer annular lower mould part to give an outer part of the annular portion of the sheet of plastic material the curved-down shape; and the third upper annular wall part is in a position above the sheet of plastic material;

the apparatus has a second operational condition in which the third upper annular wall part, starting from the first operational condition, has moved down axially with respect to the first lower annular wall part, the outer annular lower mould part, the first upper annular wall part, and the second upper annular wall part, and has, in cooperation with an outer edge of the outer annular lower mould part, cut the annular portion of the sheet of plastic material free from surrounding material of the sheet;

the apparatus has a third operational condition in which the outer annular lower mould part, starting from the second operational condition, has moved down axially with respect to the first lower annular wall part, such that the curved-down outer part of the annular portion of the sheet of plastic material is without support; and the apparatus has a fourth operational condition in which the first lower annular wall part together with the first upper annular wall part, starting from the third operational condition, have moved up axially with respect to the outer annular lower mould part and the second upper annular wall part, such that the second upper annular wall part has bent down the curved-down outer part of the annular portion of the sheet of plastic material with respect to an inner portion of the annular portion of the sheet of plastic material supported by the first lower annular wall part, such that the curved-down outer part of the annular portion is positioned under the inner portion of the annular portion.

13. The moulding apparatus of claim 12, wherein:

the apparatus has a fifth operational condition in which the first lower annular wall part together with the first upper annular wall part, starting from the fourth operational condition, have moved down axially with respect to the outer annular lower mould part and the second upper annular wall part, such that the first bottom surface of the first upper annular wall part and the second bottom surface of the second upper annular wall part are flush with each other; and the apparatus has a sixth operational condition in which the first lower annular wall part together with the first upper annular wall part and the second upper annular wall part, starting from the fifth operational condition, have moved down axially with respect to the outer annular lower mould part such that the annular portion is pinched axially between the outer annular lower mould part and the first and second upper annular wall parts.

14. A method of manufacturing a plastic container with the moulding system of claim 9 comprising:

arranging the sheet of plastic material between the lower mould portion and the upper mould portion;

operating through the first operational condition of the system through the first raised position, the first lowered position, the first bending position and the second raised position;

operating through the second operational condition of the system through the second lowered position and the cut position;

operating through the third operational condition of the system through the third lowered position; and operating through the fourth operational condition of the system through the third raised position and the second bending position.

15. The method of manufacturing according to claim 14 further comprising:

operating through the fifth operational condition of the system through the fourth lowered position; and operating through the sixth operational condition of the system through the fifth lowered position;

wherein the sheet of plastic material is formed into the plastic container having a curled rim.

16. A method of manufacturing a plastic container having a curled rim out of a sheet of plastic material, the method comprising:

providing the apparatus according to claim 13;

providing the sheet of plastic material;

arranging the sheet of plastic material between the upper and lower moulding means of the apparatus;

operating the apparatus to assume the first operational condition, so that an annular portion of the sheet of plastic material that is to form the rim of the container is held between the first lower annular wall part and the outer annular lower mould part therebelow and the first upper annular wall part and the second upper annular wall part thereabove, and such as to bend down an outer part of the annular portion of the sheet of plastic material at a first bend position;

operating the apparatus to make a transition from the first operational condition to the second operational condition such as to cut the annular portion of the sheet of plastic material free from surrounding material of the sheet;

operating the apparatus to make a transition from the second operational condition to the third operational condition such as to create an empty space under the outer part of the annular portion of the sheet of plastic material; and operating the apparatus to make a transition from the third operational condition to the fourth operational condition such as to bend down the bent-down outer part of the annular portion of the sheet of plastic material with respect to an inner portion of the annular portion of the sheet of plastic material, at a second bend position having a radius smaller than the first bend position, and to thus produce the curled rim.

17. The method according to claim 16 further comprising operating the apparatus to make a transition from the fourth operational condition to the fifth operational condition and to subsequently make a transition from the fifth operational condition to the sixth operational condition such as to axially pinch the curled rim.

* * * * *